US012628044B2

(12) United States Patent
Dong

(10) Patent No.: US 12,628,044 B2
(45) Date of Patent: May 12, 2026

(54) COMMUNICATION METHOD AND COMMUNICATION DEVICE UNDER MULTIPLE LINKS

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 397 days.

(21) Appl. No.: 18/025,184

(22) PCT Filed: Sep. 18, 2020

(86) PCT No.: PCT/CN2020/116221
§ 371 (c)(1),
(2) Date: Mar. 7, 2023

(87) PCT Pub. No.: WO2022/056846
PCT Pub. Date: Mar. 24, 2022

(65) Prior Publication Data
US 2024/0031869 A1 Jan. 25, 2024

(51) Int. Cl.
*H04W 28/10* (2009.01)
*H04W 8/24* (2009.01)
(52) U.S. Cl.
CPC ............. *H04W 28/10* (2013.01); *H04W 8/24* (2013.01)
(58) Field of Classification Search
CPC ......... H04W 28/10; H04W 8/24; Y02D 30/70
See application file for complete search history.

(56) References Cited

U.S. PATENT DOCUMENTS

| | | | | |
|---|---|---|---|---|
| 9,553,701 B2 * | 1/2017 | Sadeghi | .............. | H04L 27/2649 |
| 10,251,085 B2 * | 4/2019 | Kim | ...................... | H04L 1/0041 |
| 2009/0122755 A1 * | 5/2009 | Seok | ...................... | H04W 28/06 |
| | | | | 370/329 |

(Continued)

FOREIGN PATENT DOCUMENTS

| | | |
|---|---|---|
| CN | 101911601 A | 12/2010 |
| CN | 103763742 A | 4/2014 |

(Continued)

OTHER PUBLICATIONS

First Office Action issued to Chinese Application No. 202080002242.8 dated Dec. 28, 2024 with English translation, (12p).

(Continued)

*Primary Examiner* — Congvan Tran
(74) *Attorney, Agent, or Firm* — Arch & Lake LLP; Hao Tan; Shen Wang

(57) ABSTRACT

The present disclosure provides a communication method and a communication device under multiple links. The communication method may comprise: determining a first message frame, said first message frame comprising a plurality of subframes, each subframe comprising a sender address and a recipient address; said determining a first message frame comprises: according to the capability information of the device sending said first message frame and the device receiving said first message frame, respectively, determining the sender address and recipient address of the subframe under different links accordingly.

13 Claims, 3 Drawing Sheets

(56)     References Cited

U.S. PATENT DOCUMENTS

| | | | | |
|---|---|---|---|---|
| 2013/0208734 A1* | 8/2013 | Wentink | ............... | H04B 1/3838 |
| | | | | 370/474 |
| 2015/0036673 A1 | 2/2015 | Asterjadhi et al. | | |
| 2017/0311310 A1* | 10/2017 | Ryu | ....................... | H04W 88/08 |
| 2017/0331587 A1* | 11/2017 | Kim | .......................... | H04L 1/16 |
| 2018/0337753 A1* | 11/2018 | Yao | ....................... | H04L 1/1607 |
| 2019/0069213 A1* | 2/2019 | Seok | ..................... | H04L 1/1835 |
| 2019/0150214 A1* | 5/2019 | Zhou | ..................... | H04W 76/15 |
| | | | | 370/329 |
| 2020/0412842 A1* | 12/2020 | Park | ........................ | H04L 69/04 |
| 2021/0144589 A1* | 5/2021 | Seok | .................. | H04W 28/065 |
| 2022/0038984 A1* | 2/2022 | Vutukuri | ................. | H04W 4/10 |

FOREIGN PATENT DOCUMENTS

| | | | |
|---|---|---|---|
| CN | 105432114 | A | 3/2016 |
| CN | 106068661 | A | 11/2016 |
| CN | 109600795 | A | 4/2019 |
| WO | 2010143894 | A2 | 12/2010 |

OTHER PUBLICATIONS

International Search Report of PCT/CN2020/116221 dated Jun. 18, 2021 with English translation, (4p).
Seok, Yongho et al., "MSDU fragmentation and aggregation in Multi-Link Operation" IEEE 802.11-20/0328r0, May 12, 2020, (12p).

\* cited by examiner

AP MLD STA MLD

AP1 ◄————— Link 1 —————► STA1

AP2 ◄————— Link 2 —————► STA2

AP3 ◄————— Link 3 —————► STA3

210 determining first
message frame

210_1 under different links, determining SA
and DA of subframe

Link 1: in respective subframes, sender address SA1, recipient address DA1

Link 2: in respective subframes, sender address SA2, recipient address DA2

Link 1: in respective subframes, sender address SA1, recipient address DA

Link 2: in respective subframes, sender address SA2, recipient address DA

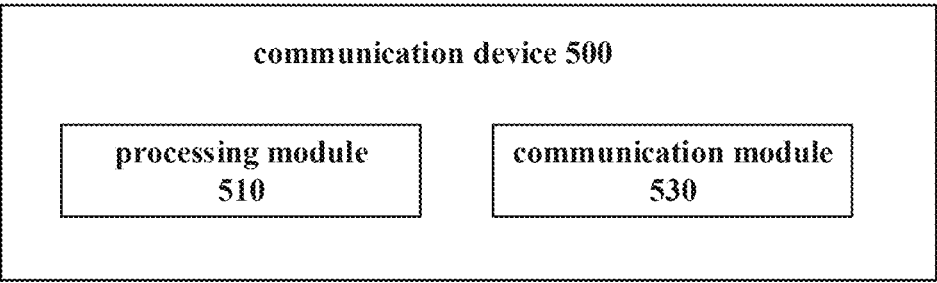
FIG. 5
| A-MSDU subframe 1 | A-MSDU subframe 2 | ...... | A-MSDU subframe n |
|---|---|---|---|
FIG. 6
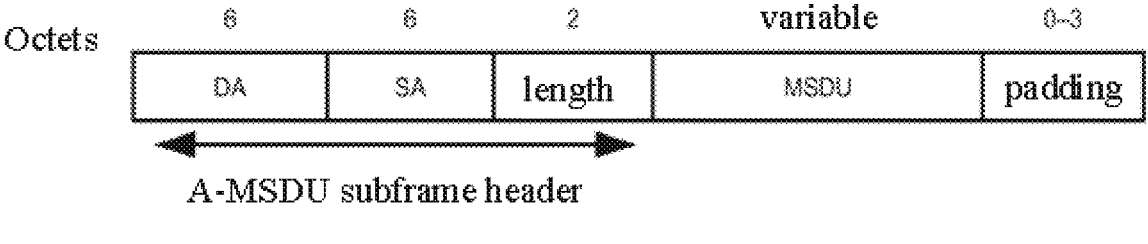
FIG. 7

COMMUNICATION METHOD AND COMMUNICATION DEVICE UNDER MULTIPLE LINKS

CROSS REFERENCE

The present application is a U.S. National Stage of International Application No. PCT/CN2020/116221, filed on Sep. 18, 2020, the contents of all of which are incorporated herein by reference in their entireties for all purposes.

TECHNICAL FIELD

The present disclosure relates to the field of communications, more specifically, to a communication method and a communication device under multiple links.

BACKGROUND

In May 2018, the IEEE (Institute of Electrical and Electronic Engineers) established the SG (study group) IEEE802.11be to study the next generation (IEEE802.11a/b/g/n/ac) Wi-Fi technology. The scope of research is 320 MHz bandwidth transmission, aggregation and cooperation of multiple frequency bands, etc. It is expected to be able to improve at least four times of the rate and throughput compared with the existing IEEE802.11ax standard. Its main application scenarios are video transmission, AR (Augmented Reality), VR (Virtual Reality), etc.

The aggregation and cooperation of multiple frequency bands mean that devices communicate with each other in 2.4 GHz, 5.8 GHz and 6-7 GHz bands simultaneously. New MAC (Media Access Control) mechanisms need to be defined to manage the communication between devices under multiple bands at the same time. In addition, low latency transmission is expected to be supported in IEEE802.11be.

In discussions of the IEEE802.11be standard, the supported maximum bandwidth is 320 MHz (160 MHz+160 MHz), with the possibility of supporting 240 MHz (160 MHz+80 MHz) and the bandwidth supported in the IEEE802.11ax standard.

In existing standards, the A-MSDU (Aggregated MAC Service Data Unit) is used to transmit data in the case of poor channel conditions or low data rates. A plurality of sub-frames can be included in the A-MSDU and it can be defined in existing standards that the DA and SA parameter values of each subframe are mapped to the same recipient address (RA) value and sender address (TA) value respectively.

In the IEEE802.11be standard, a Station (STA) and an Access Point (AP) may be a multi-link device (MLD), which may support the ability of sending and/or receiving simultaneously at the same moment under multiple links. That is, in the IEEE802.11be standard, multiple links can exist between the STA and the AP. As a result, subframes of the A-MSDU may be transmitted or retransmitted under multiple links, and the AP MLD and non-AP STA MLD may have different local MAC addresses under multiple links.

SUMMARY

Various embodiments of the present disclosure provide the following technical solutions.

An example embodiment of the present disclosure provides a communication method under multiple links. The communication method may include: determining a first message frame, wherein the first message frame includes a plurality of subframes, each subframe includes a sender address and a recipient address, wherein said determining a first message frame includes: based on capability information of a device sending the first message frame and a device receiving the first message frame, respectively, determining the sender address and recipient address of the subframe under different links accordingly.

According to an example embodiment of the present disclosure, the communication method further includes: setting a capability bit in an extremely high throughput capability element to indicate that a multi-link device supports transmission of the plurality of subframes of the first message frame under multiple links.

According to an example embodiment of the present disclosure, the communication method further includes: in response that the device sending the first message frame supports simultaneous sending and/or receiving under multiple links, setting the sender address of the subframe to be different under different links.

According to an example embodiment of the present disclosure, the communication method further includes: in response that the device sending the first message frame does not support simultaneous sending and/or receiving under multiple links, setting the sender address of the subframe to be identical under different links.

According to an example embodiment of the present disclosure, the communication method further includes: in response that the device sending the first message frame does not support simultaneous sending and/or receiving under multiple links, setting the sender address of the subframe to be different under different links.

According to an example embodiment of the present disclosure, the communication method further includes: in response that the device receiving the first message frame supports simultaneous sending and/or receiving under multiple links, setting the recipient address of the subframe to be different under different links.

According to an example embodiment of the present disclosure, the communication method further includes: in response that the device receiving the first message frame does not support simultaneous sending and/or receiving under multiple links, setting the recipient address of the subframe to be identical under different links.

According to an example embodiment of the present disclosure, the communication method further includes: in response that the device receiving the first message frame does not support simultaneous sending and/or receiving under multiple links, setting the recipient address of the subframe to be different under different links.

According to an example embodiment of the present disclosure, the communication method further includes: in response that neither the device sending the first message frame nor the device receiving the first message frame supports simultaneous sending and/or receiving under multiple links, setting the sender address of the subframe to be identical and the recipient address of the subframe to be identical under each link.

According to an example embodiment of the present disclosure, the subframe further includes a link identifier for identifying a link for sending the first message frame.

According to an example embodiment of the present disclosure, the link identifier is set in a padding subfield of the subframe.

According to an example embodiment of the present disclosure, the link identifier is set in an MAC header portion of the subframe.

An example embodiment of the present disclosure provides a communication device under multiple links. The communication device includes: a processing module, configured to determine a first message frame, wherein the first message frame includes a plurality of subframes, each subframe includes a sender address and a recipient address, wherein the processing module is further configured to: based on capability information of a device sending the first message frame and a device receiving the first message frame, respectively, determine the sender address and recipient address of the subframe under different links accordingly.

An example embodiment of the present disclosure provides an electronic device. The electronic device includes a memory, a processor and a computer program stored on the memory and runnable on the processor. The processor implements the method described above when executing the computer program.

An example embodiment of the present disclosure provides a non-transitory computer readable storage medium. The computer readable storage medium has a computer program stored thereon. The computer program implements the method described above when executed by the processor.

BRIEF DESCRIPTION OF THE DRAWINGS

These and other features of embodiments of the present disclosure will become more apparent by describing the example embodiments of the present disclosure in detail with reference to the accompanying drawings, in the drawings:

FIG. 5 is a block diagram illustrating a communication device according to an example embodiment of the present disclosure.

FIG. 6 is an example of a specific format of the A-MSDU according to an embodiment of the present disclosure.

FIG. 7 is an example of a specific format of the basic structure of each A-MSDU subframe according to an embodiment of the present disclosure.

DETAILED DESCRIPTION

The following description with reference to the accompanying drawings is provided to aid in a full understanding of the various embodiments of the present disclosure as defined by the appended claims and their equivalents. Various embodiments of the present disclosure include various specific details, but these specific details are considered to be exemplary only. In addition, descriptions of well-known techniques, functions and constructions may be omitted for the sake of clarity and brevity.

Terms and phrases used in this disclosure are not limited to their written meaning, but are used only by the inventors to enable clear and consistent understanding of the disclosure. Accordingly, for those skilled in the art, the descriptions of various embodiments of the present disclosure are provided for illustrative purposes only and are not intended to be limiting.

It should be understood that, unless the context clearly indicates otherwise, the singular forms "one", "a", "said" and "the" as used herein may also include the plural form. It should be further understood that the word "including" as used in this disclosure refers to the presence of the described features, integers, steps, operations, components and/or assemblies, but does not exclude the presence or addition of one or more other features, integers, steps, operations, components, assemblies and/or groups thereof.

It will be understood that although the terms "first", "second", etc. may be used herein to describe various elements, these elements should not be limited by these terms. These terms are only used to distinguish one element from another. Thus, without departing from the teachings of the example embodiments, the first element discussed below may be referred to as a second element.

It should be understood that when an element is referred to as "linked" or "coupled" to another element, it may be directly linked or coupled to other elements, or there may be intermediate elements. In addition, "linked" or "coupled" as used herein may include wirelessly linked or wirelessly coupled. The term "and/or" or the expression "at least one/at least one of . . . " as used herein includes any and all combinations of one or more of the relevant listed items.

Unless otherwise defined, all terms used herein, including technical and scientific terms, have the same meaning as generally understood by one of ordinary skill in the art of the present disclosure.

Figure 1:
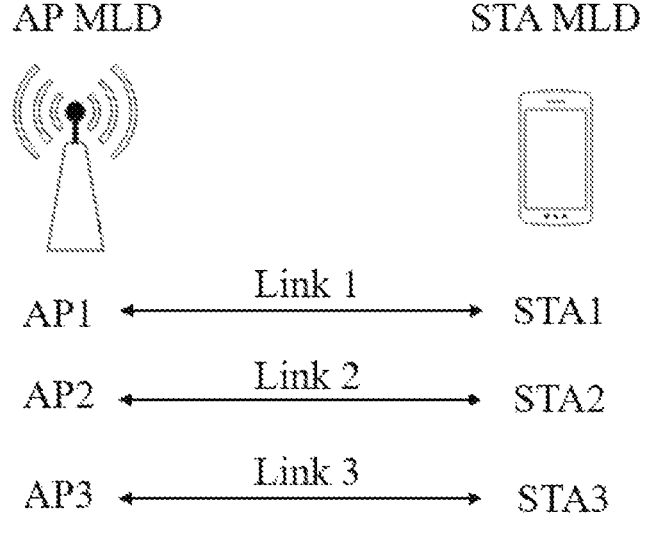
FIG. 1 is an exemplary schematic diagram of a communication scenario under multiple links.

FIG. 1 is an exemplary schematic diagram illustrating a communication scenario under multiple links.

In a wireless local area network, a basic service set (BSS) may consist of an AP and one or more stations (STA) communicating with the AP. A BSS can be connected to a Distribution System (DS) through its AP and then connected to another BSS, to form an Extended Service Set (ESS).

APs are wireless switches used in wireless networks and are the core of a wireless network. AP devices can be used as wireless base stations, and mainly used as bridges between wireless and wired networks. With this type of access point AP, wired and wireless networks can be integrated.

The AP may include software applications and/or circuits to enable other types of nodes in the wireless network to communicate with the outside and inside of the wireless network via the AP. In some examples, as an illustration, the AP may be a terminal device or network device equipped with a Wi-Fi (Wireless Fidelity) chip.

For example, stations (STAs) may include, but are not limited to, cellular phones, smart phones, wearable devices, computers, personal digital assistants (PDAs), personal communication system (PCS) devices, personal information managers (PIMs), personal navigation devices (PNDs), global positioning systems, multimedia devices, Internet of Things (IoT) devices, and the like.

In example embodiments of the present disclosure, APs and STAs may support multi-link devices. For example, they may be denoted as AP MLDs and non-AP STA MLDs, respectively. For ease of description, in the following, an example of an AP communicating with an STA under multiple links is mainly described. However, example embodiments of the present disclosure are not limited thereto.

In FIG. 1, by way of example only, an AP MLD may denote an access point that supports multi-link communication capability, and a non-AP STA MLD may denote a station that supports multi-link communication capability. Referring to FIG. 1, an AP MLD may operate under three links. For example, AP1, AP2 and AP3 shown in FIG. 1 belong to the same AP MLD. A non-AP STA MLD may also operate under three links. For example, STA1, STA2 and STA3 shown in FIG. 1 belong to the same non-AP STA MLD. In the example of FIG. 1, it is assumed that AP1 communicate with STA1 via the corresponding first link Link 1. Similarly, AP2 and AP3 communicate with STA2 and STA3 via the second link Link 2 and the third link Link 3, respectively. Furthermore, Link 1 to Link 3 may be a plurality of links at different frequencies, for example, links at 2.4 GHz, 5 GHz, 6 GHZ, etc. Furthermore, a plurality of channels may exist under each link to form different links. However, it should be understood that the communication scenario shown in FIG. 1 is only exemplary and the present disclosure is not limited to this. For example, the AP MLD may be linked to a plurality of non-AP STA MLDs, or, under each link, the AP may communicate with a plurality of other types of stations.

When the AP MLD is capable of supporting the function of simultaneous sending and/or receiving under multiple links, its attached AP1, AP2 and AP3 may have different MAC addresses. When the non-AP STA MLD is capable of supporting the function of simultaneous sending and/or receiving under multiple links, its attached STA1, STA2 and STA3 may have different MAC addresses. If the AP MLD or the non-AP STA MLD supports multiple links but does not support the function of simultaneous sending and/or receiving under multiple links at a certain moment, for example, due to near-band interference within the device, the APs under the AP MLD may have the same MAC address and the stations under the non-AP STA MLD may have the same MAC address.

Figure 2:
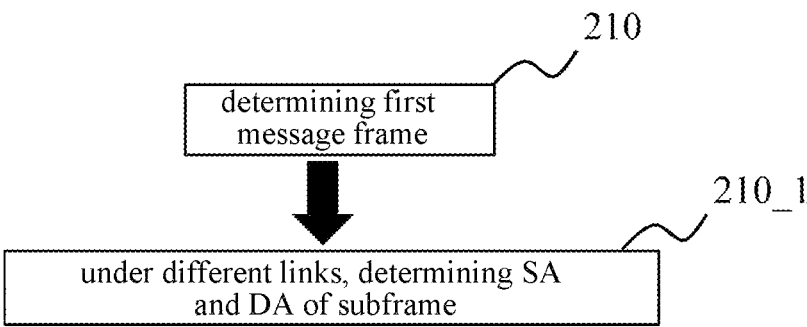
FIG. 2 is a flowchart of a communication method according to an embodiment of the present disclosure.

FIG. 2 is a flowchart illustrating a communication method according to an example embodiment of the present disclosure.

Referring to FIG. 2, in step 210, a first message frame may be determined. The first message frame may include a plurality of subframes, and each subframe may include a sender address (e.g., SA) and a recipient address (DA). In one embodiment, the first message frame may be the A-MSDU as described above. However, the present disclosure is not limited thereto.

For example, a specific format of the A-MSDU may be shown in FIG. 6.

The specific format of the basic structure of each A-MSDU subframe is shown in FIG. 7.

The A-MSDU subframe header contains three subfields: DA (destination address, which can also be called the recipient address), SA (source address, which can also be called the sender address) and Length. In existing standards, the order and number of bits in these three subfields are the same as in the format of the IEEE 802.3 frame. The values of the DA and SA subfields of the A-MSDU subframe header are passed in the MA-UNITDATA.request and MAUNIT-DATA.indication primitives. Length contains the length of bytes of the MSDU. In addition, the DA parameter value and SA parameter value of each MSDU subframe in the A-MSDU are mapped to the same recipient address (RA) value and sender address (TA) value, respectively. As described above, such structures of the A-MSDU and its subframes is not applicable to multi-link communication, i.e., not applicable to the transmission of multiple subframes of a first message frame under multiple links. Therefore, the communication method of the present disclosure defines sender addresses and recipient addresses of subframes under different links, under multiple links, which will be described in detail below.

In one embodiment, step 210 may include: determining the sender address and the recipient address of a subframe under different links (210_1). Specifically, step 210 of determining the first message frame may include: based on capability information of a device sending the first message frame and a device receiving the first message frame, respectively, determining the sender address and recipient address of the subframe under different links accordingly. According to embodiments of the present disclosure, the capability information of the device sending the first message frame may refer to whether the device is capable of supporting simultaneous sending and/or receiving under multiple links, and the capability information of the device receiving the first message frame may refer to whether the device is capable of supporting simultaneous sending and/or receiving under multiple links. In the description below, "supporting simultaneous sending and/or receiving under multiple links" may be used interchangeably with "supporting the first capability" for ease of description.

It may define in the capability bit of the extremely high throughput capability element (EHT Capabilities element) whether a multi-link device can enable the first message frame to be divided into multiple sub-frames for transmission under multiple links. The capability bit of the EHT Capabilities element may be for example, "Fragmentation At MLD Support". However, this is only exemplary and other definitions of the capability bit with similar meaning are also possible. In one example, when the capability bit is set to 1, it indicates that the multi-link device supports transmission of multiple subframes of the first message frame under multiple links. When the capability bit is set to 0, it indicates that the multi-link device does not support transmission of multiple subframes of the first message frame under multiple links.

The communication method according to embodiments of the present disclosure may include (not specifically shown in the accompanying drawings): setting a capability bit in an extremely high throughput capability element to indicate that a multi-link device supports transmission of the plurality of subframes of the first message frame under multiple links. That is, the multi-link device supports transmission of multiple subframes of the first message frame under multiple links only when the capability bit is set to a specific value, for example, "1" described above. By way of example, the step of setting the capability bit may be a step performed prior to step 210 shown in FIG. 2, however, the present disclosure is not limited thereto. For example, the step of setting the capability bit may also be omitted. For example, the capability bit may be set by default in manufacturing to indicate that the multi-link device supports transmission of multiple subframes of the first message frame under multiple links.

In the present disclosure, a different local MAC address or the same local MAC address may be set for subframes of the A-MSDU under different links based on the capability information of the AP MLD or non-AP STA MLD. The local MAC address refers to the MAC address used under this link. Step 210 and its sub-step 210_1 of FIG. 2 may be operations performed at the sender or at the receiver. The sender may be the device sending the first message frame, which may be an AP MLD or a non-AP STA MLD. The receiver may be the device receiving the first message frame, which may be a non-AP STA MLD or an AP MLD, which will be described below respectively.

<I: AP MLD is the Sender, Both AP MLD and Non-AP STA MLD Support First Capability>

When the AP MLD is the sender, it can normally be assumed that AP MLD supports simultaneous sending and/ or receiving under multiple links. Therefore, the sender address of the subframe is set to be different under different links.

In the situation where the AP MLD is the sender, the non-AP STA MLD may act as the receiver and the non-AP STA MLD may support simultaneous sending and/or receiving under multiple links. In this situation, in response that the non-AP STA MLD supports simultaneous sending and/or receiving under multiple links, the recipient address of the subframe is set to be different.

That is, both the AP MLD and the non-AP STA MLD support simultaneous sending and/or receiving, then the SA and DA in the subframe of the A-MSDU under different links are set as the MAC addresses of the AP MLD and the non-AP STA MLD under different links.

Referring to FIG. 1, it can be assumed that a first message frame is sent to STA1 via AP1 under the first link Link 1, while a first message frame is sent to STA2 via AP2 under the second link Link 2. Then, the sender address and recipient address of the subframe under the first link Link 1 and the second link Link 2 can be set as shown in FIG. 3.

Figure 3:
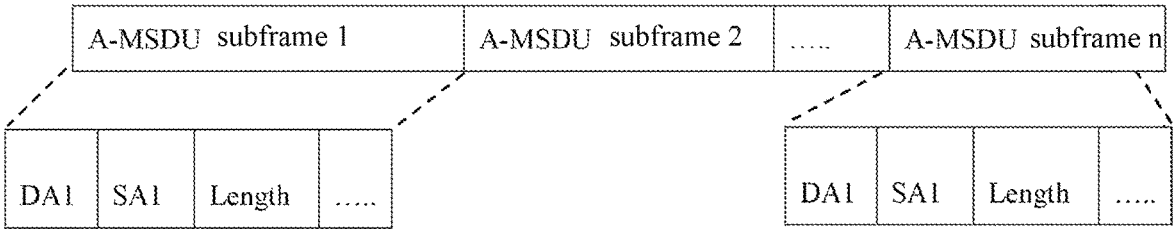
FIG. 3 is an example of SA and DA under different links according to an embodiment of the present disclosure.
Figure 3:
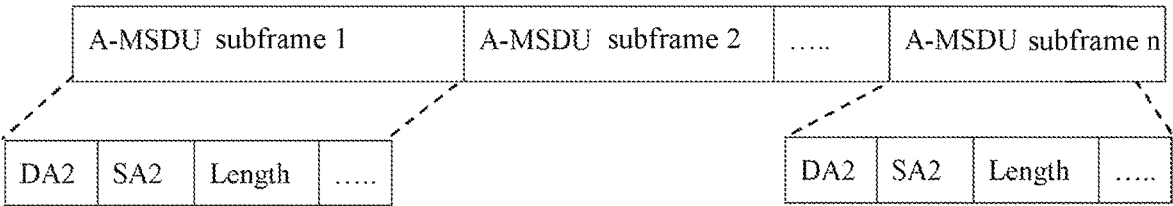

Referring to FIG. 3, the sender address (SA1) of each subframe under the first link Link 1 can be different from the sender address (SA2) of each subframe under the second link Link 2, and the recipient address (DA1) of each subframe under the first link Link 1 can be different from the recipient address (DA2) of each subframe under the second link Link 2.

<II: AP MLD is the Sender, AP MLD Supports First Capability, Non-AP STA MLD does not Support First Capability>

As described above, the AP MLD as the sender can support first capability, while although the non-AP STA MLD as the receiver can support multi-link communication, it does not support the first capability at a certain moment. In this situation, in response that the AP MLD supports simultaneous sending and/or receiving under multiple links, the sender address of the subframe is set to be different under different links. In response that the non-AP STA MLD does not support simultaneous sending and/or receiving under multiple links, the recipient address of the subframe is set to be the same under different links.

Figure 4:
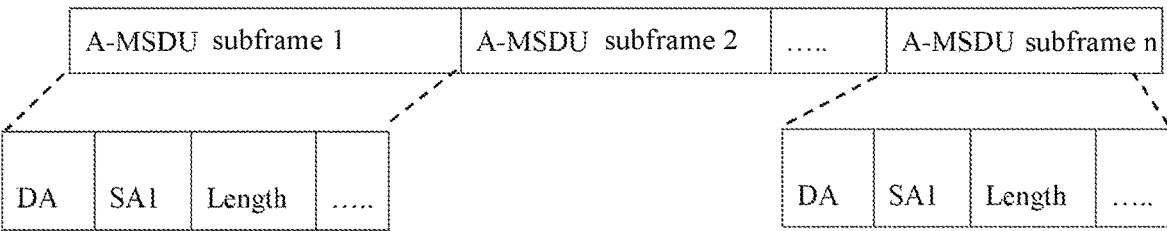
FIG. 4 is an example of SA and DA under different links according to an embodiment of the present disclosure.
Figure 4:
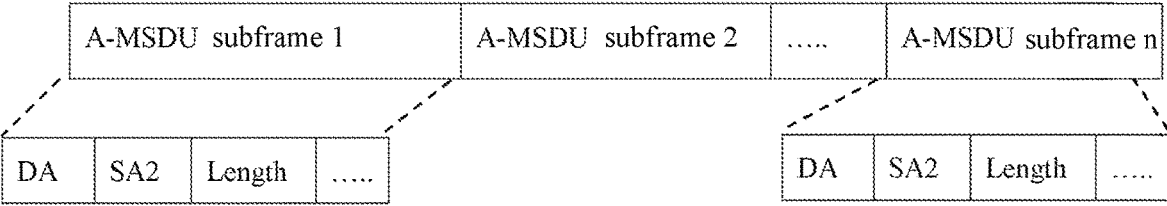

When the first link Link 1 and the second link Link 2 of FIG. 1 are used for communication, the sender address and recipient address of the subframe under the first link Link 1 and the second link Link 2 can be set as shown in FIG. 4.

Referring to FIG. 4, the sender address (SA1) of each subframe under the first link Link 1 may be different from the sender address (SA2) of each subframe under the second link Link 2, and the recipient address (DA) of each subframe under the first link Link 1 may be the same as the recipient address (DA) of each subframe under the second link Link 2.

However, this is only exemplary and the present disclosure is not limited thereto. For example, even when the non-AP STA MLD does not support simultaneous sending and/or receiving under multiple links, the MAC addresses of its attached STAs may also be different, then the recipient addresses may be set to be different under different links. As an example, it could be similar to FIG. 3, the recipient address (DA1) of each receiver under the first link Link 1 could be different from the recipient address (DA2) of each subframe under the second link Link 2.

<III: AP MLD is the Sender and Neither the AP MLD Nor the Non-AP STA MLD Supports First Capability>

In this situation, in response to that neither the device (AP MLD) sending the first message frame nor the device (non-AP STA MLD) receiving the first message frame supports simultaneous sending and/or receiving under multiple links, the sender address of the subframe is set to be the same and the recipient address of the subframe is set to be the same under each link.

When the first link Link 1 and the second link Link 2 of FIG. 1 are used for communication, in this situation, the sender address of each subframe under the first link Link 1 may be the same as the sender address of each subframe under the second link Link 2, and the recipient address of each subframe under the first link Link 1 may be the same as the recipient address of each subframe under the second link Link 2.

This situation is similar to that defined in existing standards and may be considered compatible with existing standards for communication methods according to embodiments of the present disclosure.

<IV: Non-AP STA MLD is the Sender, Both Non-AP STA MLD and AP MLD Support First Capability>

The situation IV described herein can be similar to the situation I described above. That is, in response that the device (non-AP STA MLD) sending the first message frame supports simultaneous sending and/or receiving under multiple links, the sender address of the subframe is set to be different under different links. In response that the device (AP MLD) receiving the first message frame supports simultaneous sending and/or receiving under multiple links, the recipient address of the subframe is set to be different under different links.

<VI: Non-AP STA MLD is the Sender, Non-AP STA MLD does not Support First Capability, AP MLD Supports First Capability>

In one embodiment, the non-AP STA MLD does not support the first capability and the MAC addresses of its attached STAs can set to be the same, and therefore, the sender address of the subframe can be set to be the same under different links. Since the AP MLD supports first capability, the sender address of the subframe can be set to be different under different links.

When the first link Link 1 and the second link Link 2 of FIG. 1 are used for communication, in this situation, the sender address of each subframe under the first link Link 1 may be the same as the sender address of each subframe under the second link Link 2, and the recipient address of each subframe under the first link Link 1 may be different from the recipient address of each subframe under the second link Link 2.

In another embodiment, although the non-AP STA MLD does not support the first capability, the MAC addresses of its attached STAs may also be set to be different, and then the sender address of the subframe may be set to be different under different links. Since the AP MLD supports the first capability, the sender address of the subframe may be set to be different under different links.

When the first link Link I and the second link Link 2 of FIG. 1 are used for communication, in this situation, the sender address of each subframe under the first link Link 1 may be different from the sender address of each subframe under the second link Link 2, and the recipient address of each subframe under the first link Link 1 may be different from the recipient address of each subframe under the second link Link 2.

<VII: Non-AP STA MLD is the Sender, and Neither the Non-AP STA MLD Nor the AP MLD Supports the First Capability>

In this situation, in response that neither the device (non-AP STA MLD) sending the first message frame nor the device (AP MLD) receiving the first message frame supports simultaneous sending and/or receiving under multiple links, the sender address of the subframe is set to the same and the recipient address of the subframe is set to the same under each link.

When the first link Link 1 and the second link Link 2 of FIG. 1 are used for communication, in this situation, the sender address of each subframe under the first link Link 1 may be the same as the sender address of each subframe under the second link Link 2, and the recipient address of each subframe under the first link Link 1 may be the same as the recipient address of each subframe under the second link Link 2.

This situation is similar to that defined in existing standards and may be considered compatible with existing standards for communication methods according to embodiments of the present disclosure.

According to embodiments of the present disclosure, taking into account that subframes of the A-MSDU may need to be transmitted under multiple links, the subframe may include a link identifier, which is used for identifying a link for sending the first message frame. In one embodiment, this link identifier may be set in a padding subfield of the subframe. For example, the link identifier may be added in the padding subfield of each subframe. In another embodiment, the link identifier may be set in the MAC header portion of the subframe. That is, the link identifier may be added in the MAC header portion of each subframe.

FIG. 5 is a block diagram of a communication device 500 under multiple links according to an example embodiment of the present disclosure.

Referring to FIG. 5, the communication device 500 may include a processing module 510.

According to embodiments of the present disclosure, the processing module 510 may be configured to determine a first message frame, wherein the first message frame includes a plurality of subframes, each subframe includes a sender address and a recipient address. According to embodiments of the present disclosure, the processing module 510 may further be configured to: based on capability information of a device sending the first message frame and a device receiving the first message frame, respectively, determine the sender address and recipient address of the subframe under different links accordingly.

The communication device 500 may be configured as a sender or as a receiver and may accordingly perform the operations described in situations I to VII above.

According to embodiments of the present disclosure, the processing module 510 may be configured to set a capability bit in an extremely high throughput capability element to indicate that a multi-link device supports transmission of the plurality of subframes of the first message frame under multiple links According to embodiments of the present disclosure, the processing module 510 may be configured to: in response that the device sending the first message frame supports simultaneous sending and/or receiving under multiple links, set the sender address of the subframe to be different under different links.

According to embodiments of the present disclosure, the processing module 510 may be configured to: in response that the device sending the first message frame does not support simultaneous sending and/or receiving under multiple links, set the sender address of the subframe to be identical under different links.

According to embodiments of the present disclosure, the processing module 510 may be configured to: in response that the device sending the first message frame does not support simultaneous sending and/or receiving under multiple links, set the sender address of the subframe to be different under different links.

According to embodiments of the present disclosure, the processing module 510 may be configured to: in response that the device receiving the first message frame supports simultaneous sending and/or receiving under multiple links, set the recipient address of the subframe to be different under different links.

According to embodiments of the present disclosure, the processing module 510 may be configured to: in response that the device receiving the first message frame does not support simultaneous sending and/or receiving under multiple links, set the recipient address of the subframe to be identical under different links.

According to embodiments of the present disclosure, the processing module 510 may be configured to: in response that the device receiving the first message frame does not support simultaneous sending and/or receiving under multiple links, set the recipient address of the subframe to be different under different links.

According to embodiments of the present disclosure, processing module 510 may be configured to: in response that neither the device sending the first message frame nor the device receiving the first message frame supports simultaneous sending and/or receiving under multiple links, set the sender address of the subframe to be identical and the recipient address of the subframe to be identical under each link.

According to embodiments of the present disclosure, the processing module 510 may be configured to: set the link identifier in the subframe. That is, the subframe further includes a link identifier for identifying a link for sending the first message frame.

According to embodiments of the present disclosure, the link identifier is set in a padding subfield of the subframe.

According to embodiments of the present disclosure, the link identifier is set in an MAC header portion of the subframe.

Further, the communication device 500 may include a communication module 520. The communication module 520 may communicate with other communication devices. For example, communication module 530 may send the first message frame determined by processing module 510 to other communication devices. In addition, the communication module 530 may receive response information and/or data from the other communication devices.

The communication method and communication device according to embodiments of the present disclosure are capable of supporting multi-link communication, reducing signaling overhead, and increasing networkable throughput.

Based on the same principles as the methods provided in embodiments of the present disclosure, embodiments of the present disclosure also provide an electronic device including a processor and a memory. The machine readable instructions, which may also be referred to as a "computer programs", are stored in the memory. The processor is used for executing the machine readable instructions to implement the method described with reference to FIGS. 2 to 4.

Embodiments of the present disclosure also provide a non-transitory computer-readable storage medium on which a computer program is stored. The computer program is executed by the processor to implement the method described with reference to FIGS. 2 to 4.

In example embodiments, the processor may be a logic box, module and circuit for implementing or executing various examples described in conjunction with the present disclosure, for example, a CPU (Central Processing Unit), a general purpose processor, a DSP (Digital Signal Processor), an ASIC (Application Specific Integrated Circuit), FPGA (Field Programmable Gate Array) or other programmable logic devices, transistor logic devices, hardware components, or any combination thereof. The processor may also be a combination that implements a computing function, such as a combination containing one or more microprocessors, a combination of a DSP and a microprocessor, etc.

In example embodiments, the memory may be, for example, ROM (Read Only Memory), RAM (Random Access Memory), EEPROM (Electrically Erasable Programmable Read Only Memory), CD-ROM (Compact Disc Read Only Memory) or other optical disc storage, optical disc storage (including compact discs, laser discs, CD-ROMs, digital versatile discs, Blu-ray discs, etc.), disk storage media or other magnetic storage device, or any other medium capable of carrying or storing program code in the form of instructions or data structures and capable of being accessed by a computer, but not limited thereto.

It should be understood that although the steps in the flowchart of the accompanying drawings are shown in the order indicated by the arrows, the steps are not necessarily performed in the order indicated by the arrows. Unless expressly stated herein, there is no strict sequential limitation on the execution of these steps, which may be performed in any other order. In addition, at least some of the steps in the flowchart of the accompanying drawings may include a plurality of sub-steps or a plurality of stages which are not necessarily performed at the same moment, but may be performed at different moments. The order in which they are performed is not necessarily sequential, but may be performed alternatively with other steps or at least portions of sub-steps or stages of other steps.

Although the present disclosure has been shown and described with reference to certain embodiments of the present disclosure, it will be understood by those skilled in the art that various changes in form and detail may be made without departing from the scope of the present disclosure. Accordingly, the scope of the present disclosure should not be limited to the embodiments, but should be defined by the appended claims and their equivalents.

What is claimed is:

1. A communication method under multiple links, comprising:

determining a first message frame, wherein the first message frame comprises a plurality of subframes, and each subframe comprises a sender address and a recipient address, determining the first message frame comprises: based on capability information of a device sending the first message frame and capability information of a device receiving the first message frame, respectively, determining the sender address and the recipient address of a subframe under different links accordingly, wherein the capability information of the device sending the first message frame indicates whether the device is capable of supporting simultaneous sending and/or receiving under multiple links, and the capability information of the device receiving the first message frame indicates whether the device is capable of supporting simultaneous sending and/or receiving under multiple links, and

in response that the device sending the first message frame supports simultaneous sending and/or receiving under multiple links, setting the sender address of the subframe to be different under different links.

2. The communication method according to claim 1, further comprising:

setting a capability bit in an extremely high throughput capability element to indicate that a multi-link device supports transmission of the plurality of subframes of the first message frame under multiple links.

3. The communication method according to claim 1, further comprising: in response that the device sending the first message frame does not support simultaneous sending and/or receiving under multiple links, setting the sender address of the subframe to be identical under different links.

4. The communication method according to claim 1, further comprising: in response that the device sending the first message frame does not support simultaneous sending and/or receiving under multiple links, setting the sender address of the subframe to be different under different links.

5. The communication method according to claim 1, further comprising: in response that the device receiving the first message frame supports simultaneous sending and/or receiving under multiple links, setting the recipient address of the subframe to be different under different links.

6. The communication method according to claim 1, further comprising: in response that the device receiving the first message frame does not support simultaneous sending and/or receiving under multiple links, setting the recipient address of the subframe to be identical under different links.

7. The communication method according to claim 1, further comprising: in response that the device receiving the first message frame does not support simultaneous sending and/or receiving under multiple links, setting the recipient address of the subframe to be different under different links.

8. The communication method according to claim 1, further comprising:

in response that neither the device sending the first message frame nor the device receiving the first message frame supports simultaneous sending and/or receiving under multiple links, setting the sender address of the subframe to be identical and the recipient address of the subframe to be identical under each link.

9. The communication method according to claim 1, wherein the subframe further comprises a link identifier for identifying a link for sending the first message frame.

10. The communication method according to claim 9, wherein the link identifier is set in a padding subfield of the subframe.

11. The communication method according to claim 9, wherein the link identifier is set in an MAC header portion of the subframe.

12. An electronic device, comprising a memory, a processor and a computer program stored on the memory and runnable on the processor, wherein the processor, when executing the computer program, is configured to:

determine a first message frame, wherein the first message frame comprises a plurality of subframes, and each subframe comprises a sender address and a recipient address, based on capability information of a device sending the first message frame and capability information of a device receiving the first message frame, respectively, determine the sender address and the recipient address of a subframe under different links accordingly, wherein the capability information of the device sending the first message frame indicates whether the device is capable of supporting simultaneous sending and/or receiving under multiple links, and the capability information of the device receiving the first message frame indicates whether the device is capable of supporting simultaneous sending and/or receiving under multiple links, and in response that the device sending the first message frame supports simultaneous sending and/or receiving under multiple links, set the sender address of the subframe to be different under different links.

13. A non-transitory computer readable storage medium, having a computer program stored thereon, wherein the computer program, when executed by the processor, causes the processor to:

determine a first message frame, wherein the first message frame comprises a plurality of subframes, and each subframe comprises a sender address and a recipient address, based on capability information of a device sending the first message frame and capability information of a device receiving the first message frame, respectively, determine the sender address and the recipient address of a subframe under different links accordingly, wherein the capability information of the device sending the first message frame indicates whether the device is capable of supporting simultaneous sending and/or receiving under multiple links, and the capability information of the device receiving the first message frame indicates whether the device is capable of supporting simultaneous sending and/or receiving under multiple links, and in response that the device sending the first message frame supports simultaneous sending and/or receiving under multiple links, set the sender address of the subframe to be different under different links.

* * * * *